United States Patent
Kozloski et al.

(10) Patent No.: US 10,693,954 B2
(45) Date of Patent: Jun. 23, 2020

(54) BLOCKCHAIN-ENHANCED MOBILE TELECOMMUNICATION DEVICE

(71) Applicant: International Business Machines Corporation, Armonk, NY (US)

(72) Inventors: James R. Kozloski, New Fairfield, CT (US); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 326 days.

(21) Appl. No.: 15/448,822

(22) Filed: Mar. 3, 2017

(65) Prior Publication Data

US 2018/0255130 A1     Sep. 6, 2018

(51) Int. Cl.
| | |
|---|---|
| *H04L 29/08* | (2006.01) |
| *G06F 7/14* | (2006.01) |
| *H04L 9/32* | (2006.01) |
| *H04L 29/06* | (2006.01) |

(52) U.S. Cl.
CPC ............ *H04L 67/104* (2013.01); *G06F 7/14* (2013.01); *H04L 9/3239* (2013.01); *H04L 67/22* (2013.01); *H04L 63/1416* (2013.01); *H04L 2209/38* (2013.01); *H04L 2209/805* (2013.01)

(58) Field of Classification Search
CPC ............ H04L 63/1416; H04L 63/1408; H04L 67/104; H04L 67/02
See application file for complete search history.

(56) References Cited

U.S. PATENT DOCUMENTS

| | | | |
|---|---|---|---|
| 7,552,081 B2 | 6/2009 | Dutta et al. | |
| 8,121,620 B2 | 2/2012 | Kim et al. | |
| 8,768,307 B1* | 7/2014 | Heins | H04L 51/16 |
| | | | 455/412.1 |
| 8,862,097 B2 | 10/2014 | Brand et al. | |
| 2005/0086061 A1* | 4/2005 | Holtmanns | H04L 63/0407 |
| | | | 705/51 |
| 2007/0099610 A1* | 5/2007 | Kim | H04W 8/24 |
| | | | 455/432.2 |
| 2007/0123271 A1 | 5/2007 | Dickinson | |
| 2008/0162296 A1 | 7/2008 | Hanif et al. | |
| 2009/0163175 A1* | 6/2009 | Shi | H04W 8/205 |
| | | | 455/411 |

(Continued)

FOREIGN PATENT DOCUMENTS

| | | |
|---|---|---|
| WO | 2015024129 A1 | 2/2015 |
| WO | 2015085393 A1 | 6/2015 |
| WO | 2016022864 A3 | 2/2016 |

OTHER PUBLICATIONS

P. Mell et al., "The NIST Definition of Cloud Computing", National Institute of Standards and Technology, Information Technology Laboratory, Sep. 2011, pp. 1-7.

(Continued)

*Primary Examiner* — Jeong S Park

(74) *Attorney, Agent, or Firm* — Law Office of Jim Boice

(57) ABSTRACT

A computer-implemented method tracks and maintains a record of telecommunication device events using a blockchain that is supported by a peer-to-peer network. One or more processors detect one or more events at a telecommunication device, and then transmit a transaction of the one or more events from the telecommunication device to multiple remote computing devices that are part of a peer-to-peer network, which supports a blockchain that includes a block that includes the transaction of the one or more events.

20 Claims, 12 Drawing Sheets

(56) References Cited

U.S. PATENT DOCUMENTS

| | | | |
|---|---|---|---|
| 2013/0288744 A1 | 10/2013 | Vock et al. | |
| 2014/0038676 A1* | 2/2014 | Franceschini | H01M 2/1022 455/575.1 |
| 2014/0279623 A1 | 9/2014 | Mislove et al. | |
| 2015/0206106 A1 | 7/2015 | Yago | |
| 2015/0332283 A1 | 11/2015 | Witchey | |
| 2018/0124623 A1* | 5/2018 | Mishra | H04W 24/10 |
| 2018/0189781 A1* | 7/2018 | McCann | G06Q 20/382 |

OTHER PUBLICATIONS

Olga Kharif, "Blockchain Goes Beyond Crypto-Currency". Bloomberg Businessweek, May 19, 2016. Web Sep. 1, 2016. <http://www.bloomberg.com/news/articles/2016-05-19/built-for-bitcoin-blockchain-goes-beyond-crypto-currency>.

Iltifat Husain, "Smartphone Sensors Used to Determine Mental Health". Imedicalapps, Medpage Today, Sep. 23, 2014. Web Sep. 1, 2016. <http://www.imedicalapps.com/2014/09/smartphone-sensors-mental-health/#>.

G. Prisco, "IBM: Government and Blockchain Sector Should Work Together to Enhance National Security", BTC Inc., bitcoinmagazine.com, May 26, 2016, pp. 1-2.

IBM Corporation, "IBM Delivers Blockchain-As-A-Service for Developers; Commits to Making Blockchain Ready for Business", IBM, News Room, News Release, Feb. 16, 2016, pp. 1-3.

S. Brakeville et al, "Blockchain Basics: Introduction to Distributed Ledgers", IBM, developer.ibm.com, Mar. 18, 2018, pp. 1-6.

Arxan, "How to Enhance Your Cryptographic Key Protection", Arxan, Arxan Blog, arxan.com, Jan. 25, 2016, pp. 1-11.

* cited by examiner

BLOCKCHAIN-ENHANCED MOBILE TELECOMMUNICATION DEVICE

BACKGROUND

The present invention relates to the field of telecommunication devices, and particularly to telecommunication devices that are capable of logging a record of events. Still more particularly, the present invention relates to logging telecommunication device events in a distributed manner.

Smartphone security is the protection of data found in a user's mobile telecommunication device (i.e., a cell phone). When equipped with processing logic that is able to communicate with the Internet, execute specialized applications (known as "apps"), etc. a cell phone is referred to as a smartphone.

Smartphone security can take place on the smartphone itself and/or at the cellular carrier. That is, a subscriber identity module (SIM) chip on the smartphone can store encryption keys, phone numbers, contact information, calling histories, etc. However, if the SIM chip is lost or stolen, then such information can be retrieved by an unauthorized party.

Information such as phone records, contact information, etc. can also be stored on a server operated by the cellular carrier. However, this information is openly available to the cellular carrier and other parties.

SUMMARY

In one or more embodiments of the present invention, a computer-implemented method tracks and maintains a record of telecommunication device events using a blockchain that is supported by a peer-to-peer network. One or more processors detect one or more events at a telecommunication device, and then transmit a transaction of the one or more events from the telecommunication device to multiple remote computing devices that are part of a peer-to-peer network, which supports a blockchain that includes a block that includes the transaction of the one or more events.

In an embodiment of the present invention, a computer-implemented method tracks and maintains a record of telecommunication device events using a blockchain that is generated by a trans-vendor service. One or more processors detect an event at a telecommunication device, and then transmit a transaction of the event from the telecommunication device to a trans-vendor service. The trans-vendor service, which operates across disparate devices, service carriers, and operating systems, generates a blockchain that includes a block that includes the transaction of the event.

The described inventions may also be implemented in a computer system and/or as a computer program product.

DETAILED DESCRIPTION

Figure 1:
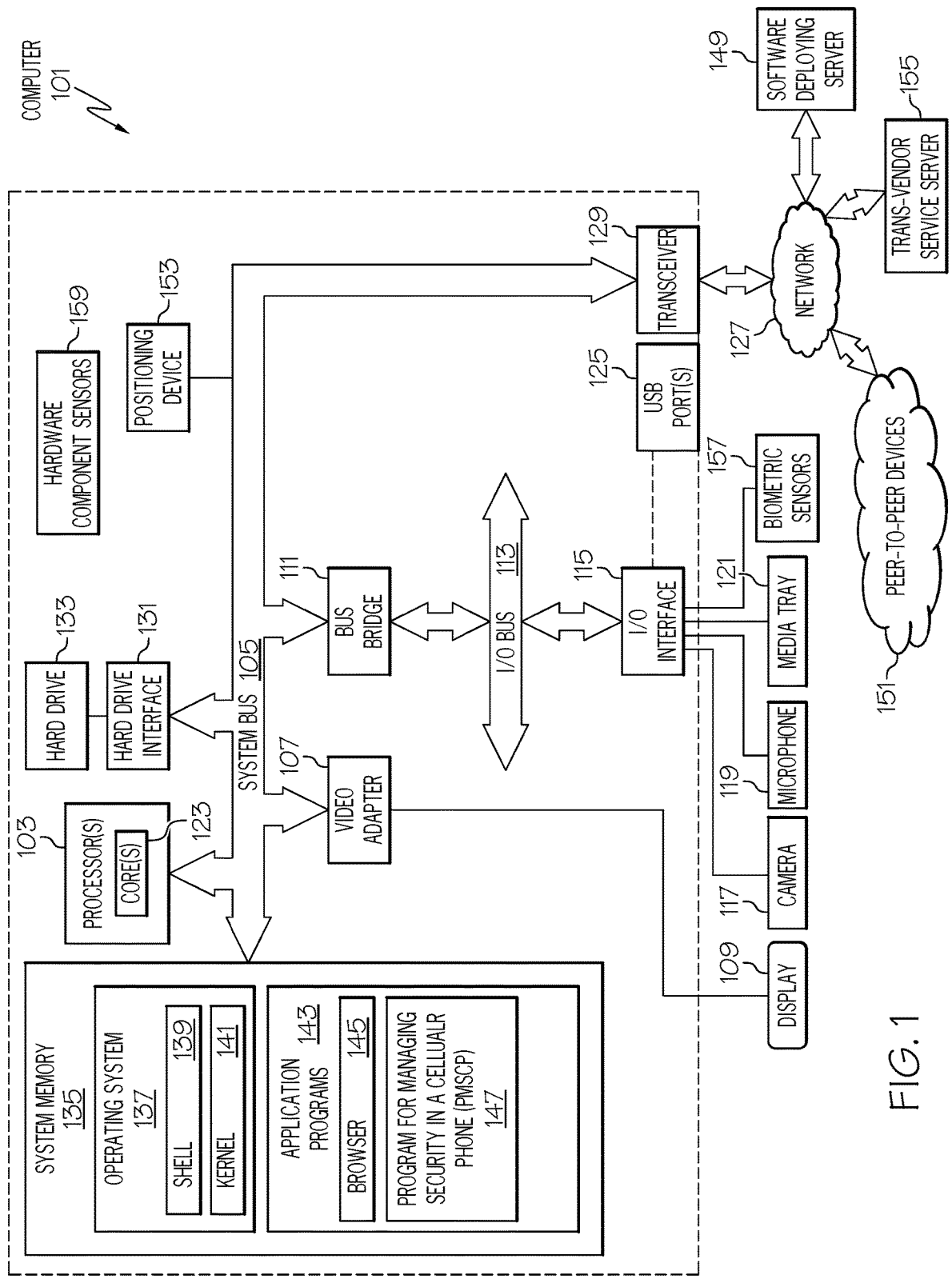
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or peer-to-peer devices 151 and/or trans-vendor service server 155 shown in FIG. 1, and/or smartphone 201 shown in FIG. 2, and/or peers 401a-401d shown in FIG. 4, and/or clients 501a-501n and/or non-validating peer 505a-505n and/or validating peer 509a-509n shown in FIG. 5.

Exemplary computer 101 includes one or more processor(s) 103 that are coupled to a system bus 105. Processor(s) 103 may each utilize one or more core(s) 123, which contain execution units and other hardware beyond that found in the rest of the processor(s) 103 (e.g., on-board random access memory, etc.). A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117, a microphone 119, a media tray 121 (which may include storage devices such as CD-ROM drives, multi-media interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems, such as peer-to-peer devices 151 and trans-vendor service server 155, using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Program for Managing Security in a Cellular Phone (PMSCP) 147. PMSCP 147 includes code for implementing the processes described below, including those described in FIGS. 2-7. In one embodiment, computer 101 is able to download PMSCP 147 from software deploying server 149, including in an on-demand basis, wherein the code in PMSCP 147 is not downloaded until needed for execution. In one embodiment of the present invention, software deploying server 149 performs all of the functions associated with the present invention (including execution of PMSCP), thus freeing computer 101 from having to use its own internal computing resources to execute PMSCP 147.

Also within computer 101 in one or more embodiments of the present invention is a positioning device 153, which provides sensor readings describing a real-time position of computer 101. Exemplary embodiments of positioning system 153 incorporate the use of accelerometers, global positioning system (GPS) sensors, etc.

Also associated with computer 101 in one or more embodiments of the present invention are biometric sensors 157, which are able to detect biometric readings that describe a state of a user of the computer 101 (particularly when architected as a smartphone). Examples of biometric sensors 157 include, but are not limited to, heart rate monitors, blood pressure monitors, respiration monitors, skin galvanometers, etc.

Also within computer 101 in one or more embodiments of the present invention are hardware component sensors 159, which monitor the states of components of computer 101. For example, hardware component sensors 159 may include a thermometer that measures the temperature of processor(s) 103, a storage controller monitor that monitors how often page swaps occur with the hard drive 133, a memory control monitor that monitors whether system memory 135 is overloaded, etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

As described herein, one or more embodiments of the present invention utilize blockchain technology to securely track and maintain a transaction of smartphone events. Smartphone transactions associated with a stakeholder are compiled into a chain of smartphone transaction blocks. The chain can be considered a chronicle of a user's smartphone usage path through time. When a transaction occurs, one or more corresponding smartphone parameters (e.g., including phone numbers called, contact lists, text chats, etc.) are sent to one or more validation modules. The modules establish a validity of the transaction and generate a new block. Once the new block has been calculated it is appended to the stakeholder's smartphone historic blockchain.

This blockchain based model of smart phone privacy solves the problem of a private service provider and provider designed phone security and pass codes acting as the trusted gatekeeper for personal information. Instead, even the service provider is locked out of the block unless a user opts into sharing this data.

Figure 2:
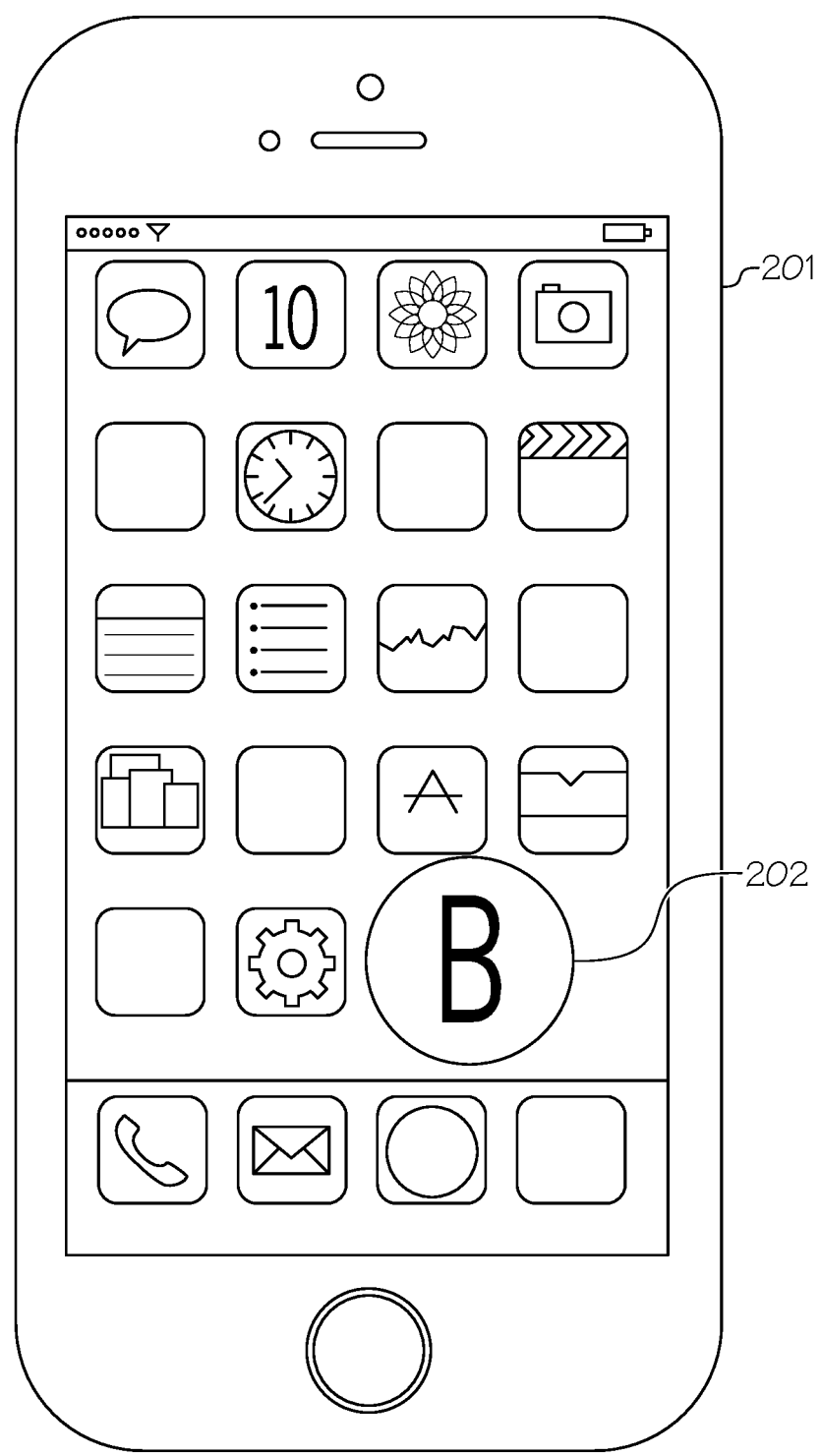
FIG. 2 illustrates an exemplary smartphone equipped with a "Blockchain Button" for activating the present invention.

Thus, as depicted in FIG. 2, the user's smartphone 201 is equipped with a blockchain activation button 202 that, when touched or otherwise activated by the user, causes the smart phone to bypass the service provider when storing a record of transactions that occur on the smartphone 201.

Figure 3:
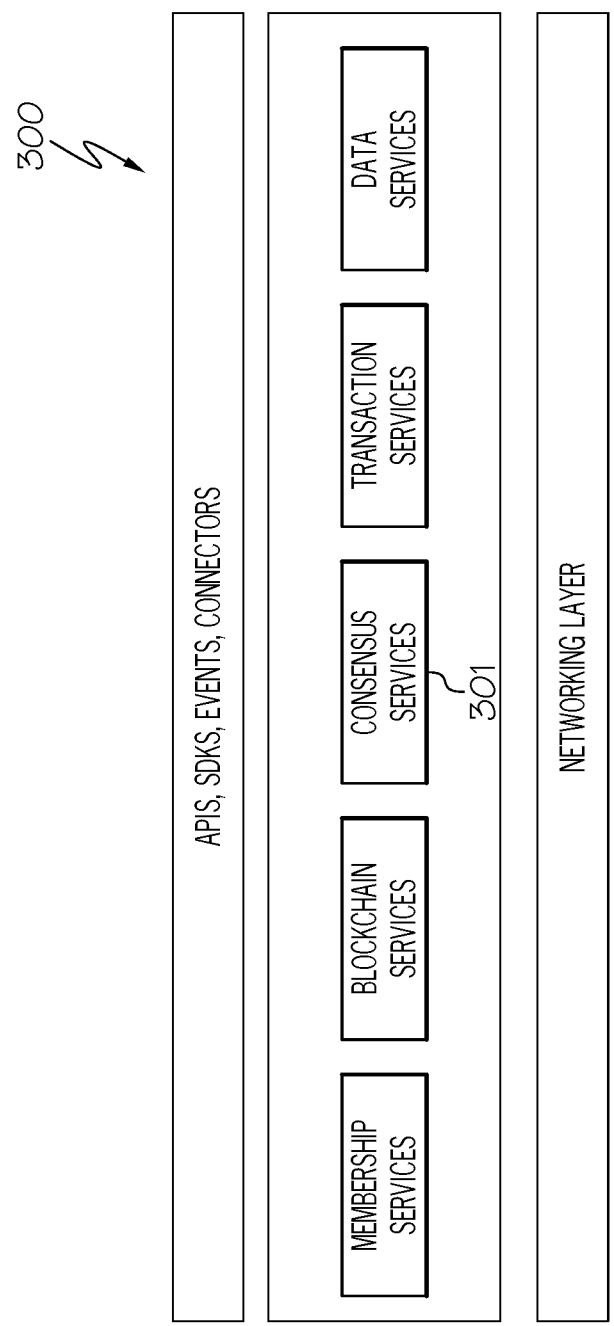
FIG. 3 depicts an exemplary blockchain architecture as used in one or more embodiments of the present invention.

In one or more embodiments of the present invention, a blockchain fabric, such as blockchain fabric 300 depicted in FIG. 3 is used to provide the infrastructure (e.g. execution of the chaincodes) and services (e.g., Membership services such as Identify management) for securely and transparently storing, tracking and managing transactions on a "single point of truth", that is, historical records related to smartphone events. The blockchain fabric 300 maintains a verifiable record (of the single point of truth) of every single transaction ever made within the system. Once data are entered onto the blockchain, they can never be erased (immutability) or changed. That is, a change to a record would be regarded as issuing/introducing a new transaction. Prohibition of such thus ensures auditability and verifiability of data.

The blockchain fabric 300 (also known as the "blockchain system", "open blockchain" or "hyperledger fabric") is based on a distributed database of records of all transactions or digital events that have been executed and shared among participating parties. An individual transaction in the blockchain is validated or verified through a consensus mechanism (e.g., consensus services 301) incorporating a majority of the participants in the system. This allows the participating entities to know for certain that a digital event happened by creating an irrefutable record in a permissioned public ledger.

As mentioned above, transactions associated with an entity (e.g., user's phone events on a smart phone) are compiled into a chain of "transaction blocks" that constitutes the lifelong record of what has happened to that entity. The chain can be considered a chronicle of a smart phone's path through time.

Figure 4:
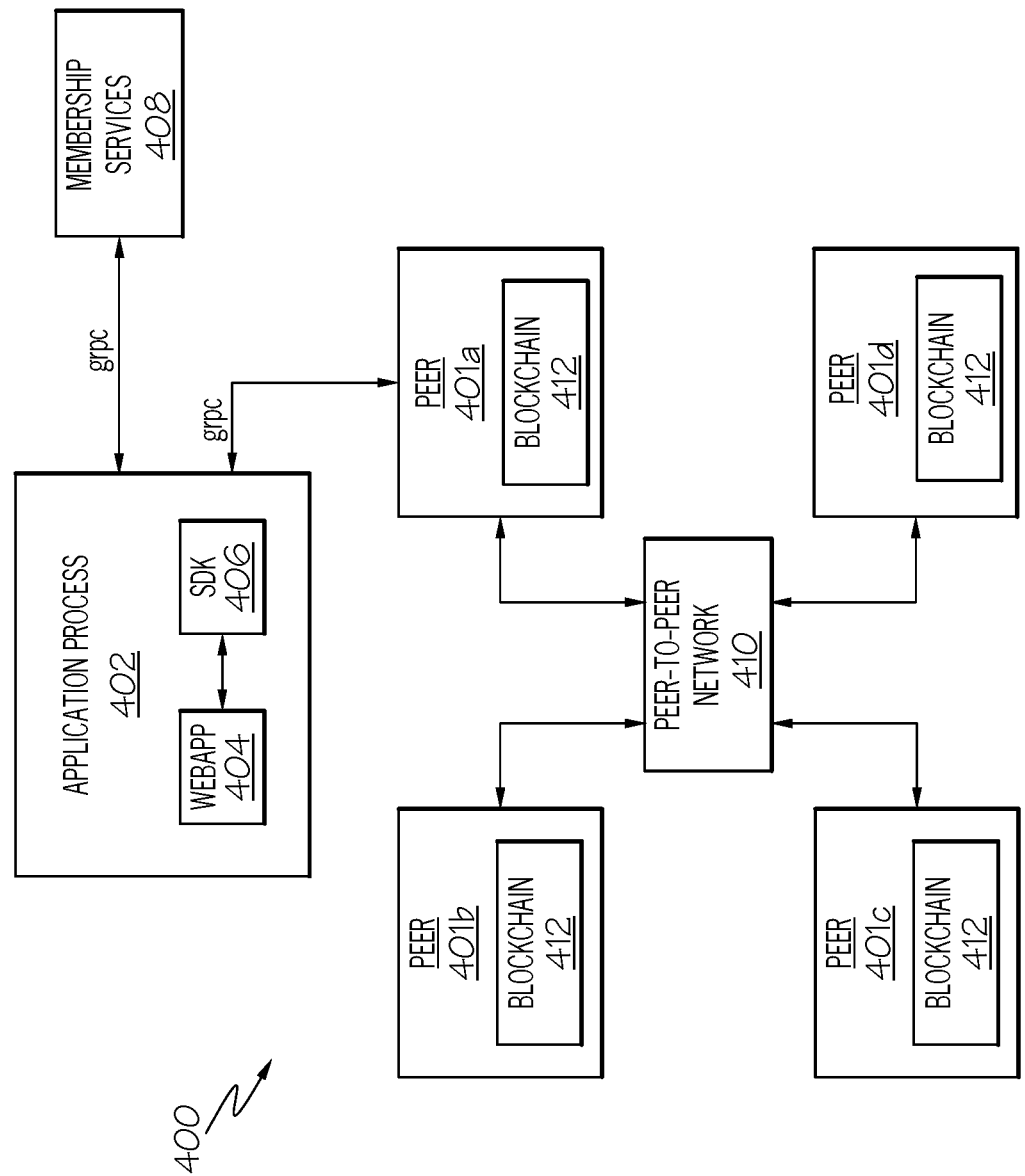
FIG. 4 illustrates an exemplary blockchain topology as used in one or more embodiments of the present invention.

When a transaction is executed, its corresponding chaincode is executed by several validating peers of the system. For example, as shown in FIG. 4, peers 401a-401d (i.e., other smartphones, computers, servers, etc.) establish the validity of the transaction parameters and, once they reach consensus, a new block is generated and appended onto the blockchain network. That is, an application process 402 running on a smart phone executes an application such as the depicted WebApp 404, causing a software development kit (SDK) 406 to communicate using general remote procedure calls (grpc) to membership services 408 that support the peer-to-peer network 410 that supports the blockchain 412 using the peers 401a-401d.

Thus, the open blockchain fabric 400 shown in FIG. 4 is blockchain deployment topology that provides a distributed ledger, which persists and manages digital events, called transactions, shared among several participants, each having a stake in these events. The ledger can only be updated by consensus among the participants. Furthermore, once transactions are recorded, they can never be altered (they are immutable). Every such recorded transaction is cryptographically verifiable with proof of agreement from the participants, thus providing a robust provenance mechanism tracking their origination.

Figure 10:
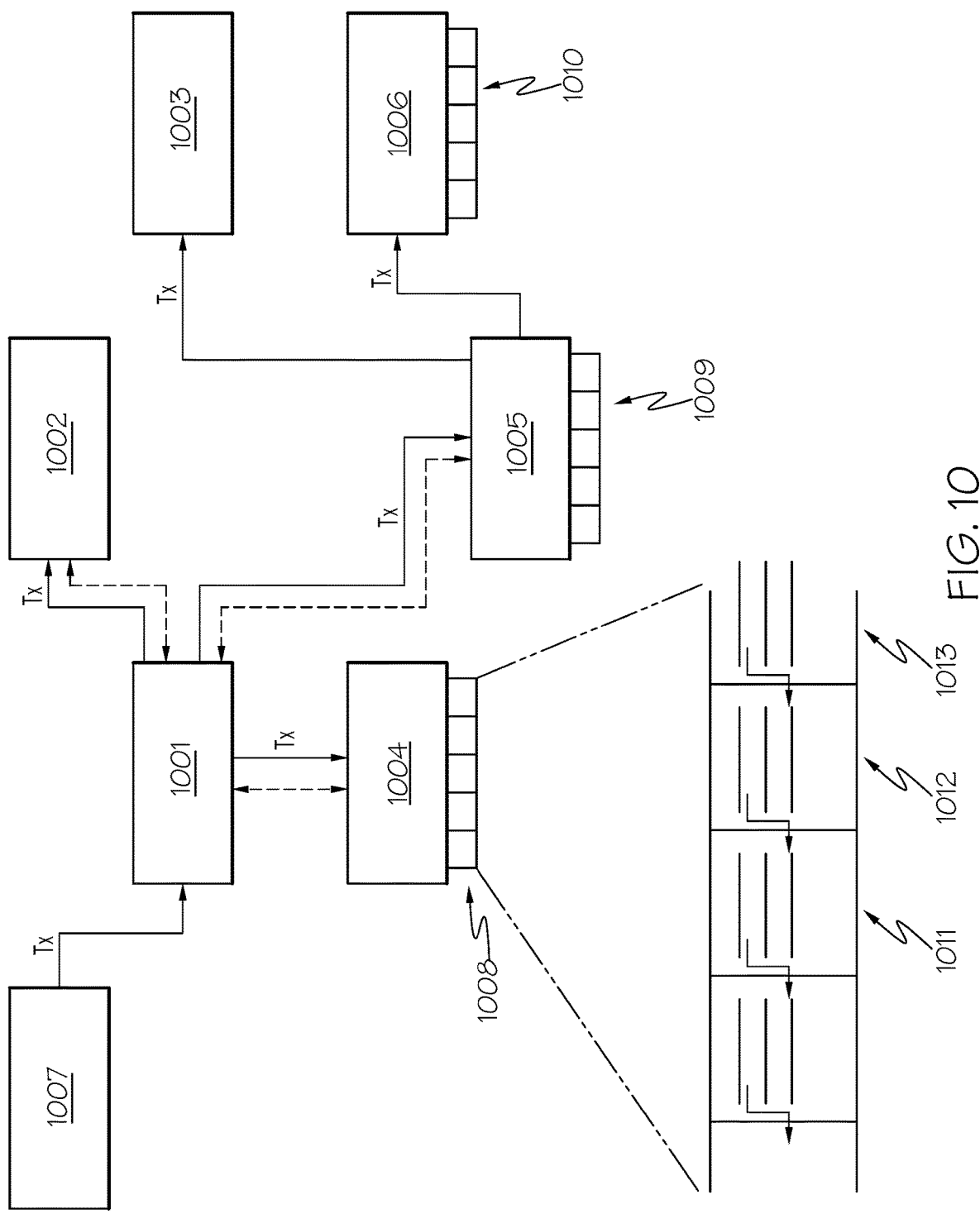
FIG. 10 is a high-level flow chart of steps performed to generate and manage a transaction in accordance with one or more embodiments of the present invention.

With reference now to FIG. 10, an illustration of exemplary blockchains as used in one or more embodiments of the present invention is presented. As shown in FIG. 10, computers 1001, 1002, 1003, 1004, 1005, and 1006 represent an exemplary peer-to-peer network of devices used to support a peer blockchain (in which more or fewer computers/machines may form the peer-to-peer network of devices). Each of the computers 1001, 1002, 1003, 1004, 1005 and 1006 (which may be telecommunication devices) in the peer-to-peer network has a same copy of data (e.g., data that represents telecommunication device events), as held in ledgers stored within the depicted blockchains 1008, 1009, 1010 that are associated with respective computers 1004, 1005, 1006.

As shown in FIG. 10, a client 1007 (e.g., a telecommunication device) sends a transaction Tx (e.g., an event that occurred with the telecommunication device) to the client's peer (depicted as computer 1001). Computer 1001 then sends the transaction Tx to ledgers known as the depicted blockchains 1008, 1009, 1010 that are associated with other peers, including the depicted computers 1002, 1004, 1005.

Blocks within exemplary blockchain 1008 are depicted as block 1011, block 1012, and block 1013. Block 1013 is depicted as a newest entry into a ledger held in blockchain 1008, and includes not only the newest transactions but also a hash of the data from the older block 1012, which includes a hash of the even older block 1011. Thus, oldest blocks are made even more secure each time a new block is created, due to the hashing operations.

As shown in FIG. 10, computer 1005 has been designated as a leader peer according to a consensus model of the peer-to-peer network. As such, the leader peer (computer 1005) organizes all transactions from the nodes/peers/computers/telecommunication devices 1001-1006, and then shares new blocks/transactions (Tx) with other nodes (e.g., computers 1003, 1006) as depicted. The nodes/computers that receive the new block/transaction (Tx) then validate the new block/transaction. If enough (i.e., some predefined quantity/percentage) of the nodes/computers validate the new block/transaction, then the new block/transaction is deemed valid for the entire peer-to-peer network of computers 1001-1006 and is added to the blockchains (including the depicted blockchains 1008, 1009, 1010) associated with all of the nodes/peers/computers 1001-1006.

In one or more embodiments of the present invention, the blockchains (including the depicted blockchains 1008, 1009, 1010) are "anchored" to a particular user or a particular telecommunication device by adding to the block/transaction information such as a phone universal unique identifier (UUID), phone numbers that are stored on the phone, phone numbers that calls are made to and/or received from on the phone, contacts/contact list stored on the phone, chat messages made to/from the phone, a geolocation of the phone, a time a user makes calls on the phone, phone numbers a user calls, various forms of phone sensor data (e.g., location sensors, heat sensors, etc.), a record of payments made (e.g., using money transferring applications) from the phone, etc.

Figure 5:
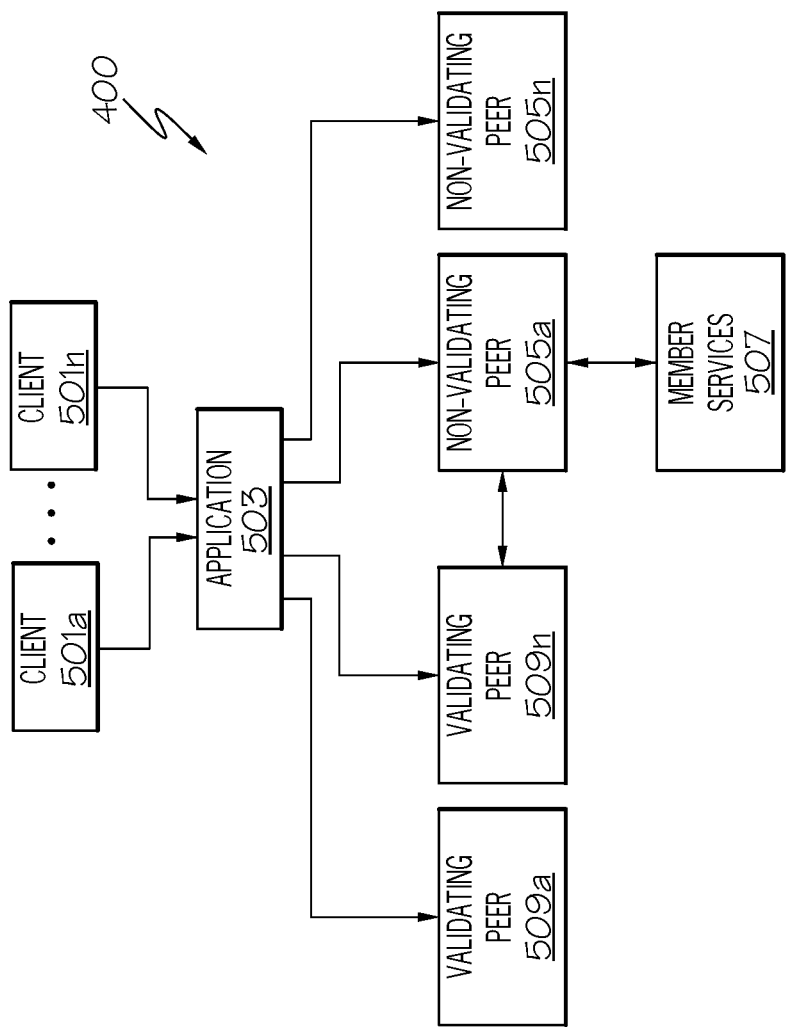
FIG. 5 depicts a deployment of a blockchain using multiple validating peers in accordance with one or more embodiments of the present invention.

Returning now to FIG. 4, solutions built on the open blockchain fabric 400 can be broken down into several components shown in FIG. 5: member services 507 (analogous to membership services 408 shown in FIG. 4), validating peers 509a-509n (one or more of the peers 401a-401d shown in FIG. 4), non-validating peers 505a-505n (one or more of the peers 401a-401d shown in FIG. 4), and an application 503 (analogous to application process 402 shown in FIG. 4) used by clients 501a-501n.

In the context of the proposed system for smart phone event management, there can be multiple blockchains (e.g., phone history blockchain, contact record blockchain, text messages blockchain, etc.), each one having its own operating parameters and security requirements.

Member services 507 manages data access.

Validating peers 509a-509n are designated nodes that participate in consensus algorithms. They are responsible for validating the data that gets persisted on the blockchain and also for the execution of logic called chaincode against the data contained in the ledger.

Non-validating peers 505a-505n maintain request services from member services 507 and validating peers 509a-509n on behalf of external client applications (application 503). In one or more embodiments of the present invention, non-validating peers 505a-505n may be optionally used, with application 503 capable of direct communication with validating peers 509a-509n.

A blockchain is a distributed database that maintains a continuously-growing list of data records hardened against tampering and revision. It consists of data structure blocks—which may exclusively hold data in initial blockchain implementations, and in another embodiment, both data and programs—with each block holding batches of individual transactions and the results of any blockchain executables. Each block contains a timestamp and information linking it to a previous block.

Thus, a blockchain serves as a public ledger of all transactions in a series using a peer-to-peer network/registry. This allows users to connect to the network/registry in order to send new transactions to the blockchain, in order to verify transactions, create new blocks, etc.

As such, a blockchain fabric uses a distributed network to maintain a digital ledger of events, thus providing excellent security for the digital ledger, since the blockchain stored in each peer is dependent upon earlier blocks, which provide encryption data for subsequent blocks in the blockchain.

Transactions are the content that is stored in the blocks in the blockchain. The validating peers 509a-509n in the blockchain confirm that the transactions are valid (i.e., legitimate). That is, the system implementing the blockchain defines a valid transaction. In one or more embodiments of the present invention, a valid transaction is digitally signed.

Blocks contain a description of the transactions. Blocks are created by users known as "miners" who use specialized software or equipment designed specifically to create blocks. In a smartphone security system, miners may be non-validating peers 505a-505n or validating peers 509a-509n.

Thus, the open blockchain fabric 400 provides a decentralized system in which every node in a decentralized system has a copy of the blockchain. This avoids the need to have a centralized database managed by a trusted third party. Transactions are broadcast to the network using software applications. Network nodes can validate transactions, add them to their copy and then broadcast these additions to other nodes. However, as noted above, the blockchain is nonetheless highly secure, since each new block is protected (e.g., encrypted) based on one or more previous blocks.

As described in the present invention, in one or more embodiments each block in the blockchain (and/or the entire blockchain) is anchored to a particular user of a smartphone. The following items can be added to the growing blockchain: the smartphone's universal unique identifier (UUID), phone numbers called by the smartphone, contacts/contact list, chat messages exchanged by the smartphone, a geolocation history of the smartphone, audio files stored/received on the smartphone, messages left on the smartphone's mailbox, ringtones, photos stored on the smartphone, volume settings on the smartphone, accessibility feature settings on the smartphone, the time a user turns a smartphone on and off, the time of day that a user makes calls on the smartphone, blocked numbers for the smartphone, spam calls received by the smartphone, scam messages received by the smartphone, the amount of power in the smartphone's battery, data in the smartphone's SD (secure digital) card, etc.

Optionally, customized analytics services can be part of the chaincodes for detecting, validating, and storing fraudulent, scam calls/message etc. by obtaining the historic user phone's blockchain, etc.

Content is added to the blocks under various circumstances and triggers. As one example, the block can be updated when a user makes calls, adds contacts, sends/saves/receives messages, etc. In one or more embodiments of the present invention, the smartphone has the dedicated button (e.g., blockchain activation button 202 shown in FIG. 2) for adding to the block, or a voice command to trigger block addition. Also, the block can be updated to the blockchain when the user speaks a command, performs a gesture, enters a workplace, enters a building, etc. Thus, blockchain activation button 202 allows the user to opt in to the blockchain system described herein for managing/storing phone events (or to opt out, but not engaging the blockchain activation button 202).

The system may start writing to the block based on geolocation or a hazard button press.

In one or more embodiments of the present invention, the rate of addition of content may automatically change by context. For example, the system may update the block more often if a user is entering a building with certain security needs or concerns. The system may update the block more when the system estimates, with confidence level L, that the phone is stolen (to achieve a greater granularity of information), and this may be useful to detect a thief or have tamper-proof evidence.

In one or more embodiments of the present invention, the rate of addition of content to the block may automatically change based on a risk assessment or forecast. For example, the system may detect, using a GPS or other positioning device, that the telecommunication device is headed toward a body of water (i.e., a lake). Proximity to the lake may indicate that the user of the telecommunication device will be traveling on a boat. As such, the risk assessment or forecast rates the likelihood of damage to/loss of the telecommunication device as higher, due to the possibility of the phone being dropped in the water, sprayed with water, dropped on rocks, etc. The system thus may update the block more often in anticipation of a riskier location/environment. The rate may change in a setting where some kind of privacy, security or auditing is more important.

The content added to the block may be a scalar or vector quantity (e.g. multidimensional). For example, a risk could be multidimensional, based on time of day, weather, geolocation, moving in a car, travelling in an unfamiliar location, travelling alone or in crowd, etc.

The content addition may be driven by the cohort and context (e.g. affective/cognitive context) of the user by analyzing the sensory data (e.g. gesture, texting speed, GPS).

In one or more embodiments, the kind or nature of the added content may be changed by some context. For example, if the risk is high, more kinds of content may be added to the block that might not ordinarily be stored. This information may include more context information, including other users (or their phones) in the vicinity.

In one embodiment, if the owner decides to sell the smartphone or pass ownership to another person, the present invention allows the user to issue a "lock-in" transaction that will de-associate all the data linked with the device. The lock-in operation may be based on risk assessment of the data being stored on the historical smartphone blockchain. This risk assessment may include sensitive data (e.g. bank accounts, social security, passwords, photos, etc.), valuation for privacy and security, etc.

Often times, the seller of a smartphone may leave an SD card in the device for the next owner, thus requiring the seller to make sure to erase all data on the SD card. However, one or more embodiments of the present invention allow the SD contents to be securely tracked and stored onto the smartphone's historic blockchain. In one embodiment, during the ownership transfer process, the system may automatically trigger an algorithm to lock-in all the data related to the SD card from being viewed or used by the new owner.

In an embodiment of the present invention, information from the blockchain may be downloaded onto the SD card, in order to restore the contents of an SD card that is erased or replaced.

The various content, data, and information added to the growing block may be obtained by the phone, which is already equipped to measure various information. As mentioned above, the phone may have an optional dedicated button for adding to the block. That is, the blockchain activation button 202 (the Big B icon) gives the user optional control about entering blockchain mode or changing the frequency with which blocks are written.

A trans-vendor service may be used to provide data when using different devices, operating systems, service carriers, etc.

In one or more embodiments of the present invention, the block may also be written to when an input or output (e.g. audio input or output wire) is plugged into the phone or when a phone subsystem may be estimated to be tampered with. Various other kinds of sensor data (see below) may be added to the block.

Smartphone Sensor-Related Features.

As described above, a positioning device 153 (e.g., a GPS system) within the smartphone may provide real-time and historical records of geophysical locations of the smartphone.

In one or more embodiments, the present invention is used to determine or predict the probability of a hardware failure or malfunction. This determination or prediction is made by employing statistical or machine learning algorithms that utilize data from a historic smartphone blockchain. Advanced customized analytics utilities may be added on top of the blockchain to periodically assess the health/security of the smartphone including individual sensors based on risk assessment of applications (e.g. high battery intensive apps, security or privacy leaking apps, etc.), etc.

Thus, the presently-presented blockchain-implemented system may be used to facilitate any of:

Lock In Attribution: the present invention can create a permanent and unbreakable link between the user and his phone use information. That link—the record of phone information—can be forever verified and tracked.

Securely Share: the present invention can securely share a user's digital phone information with others through the blockchain.

Figure 6:
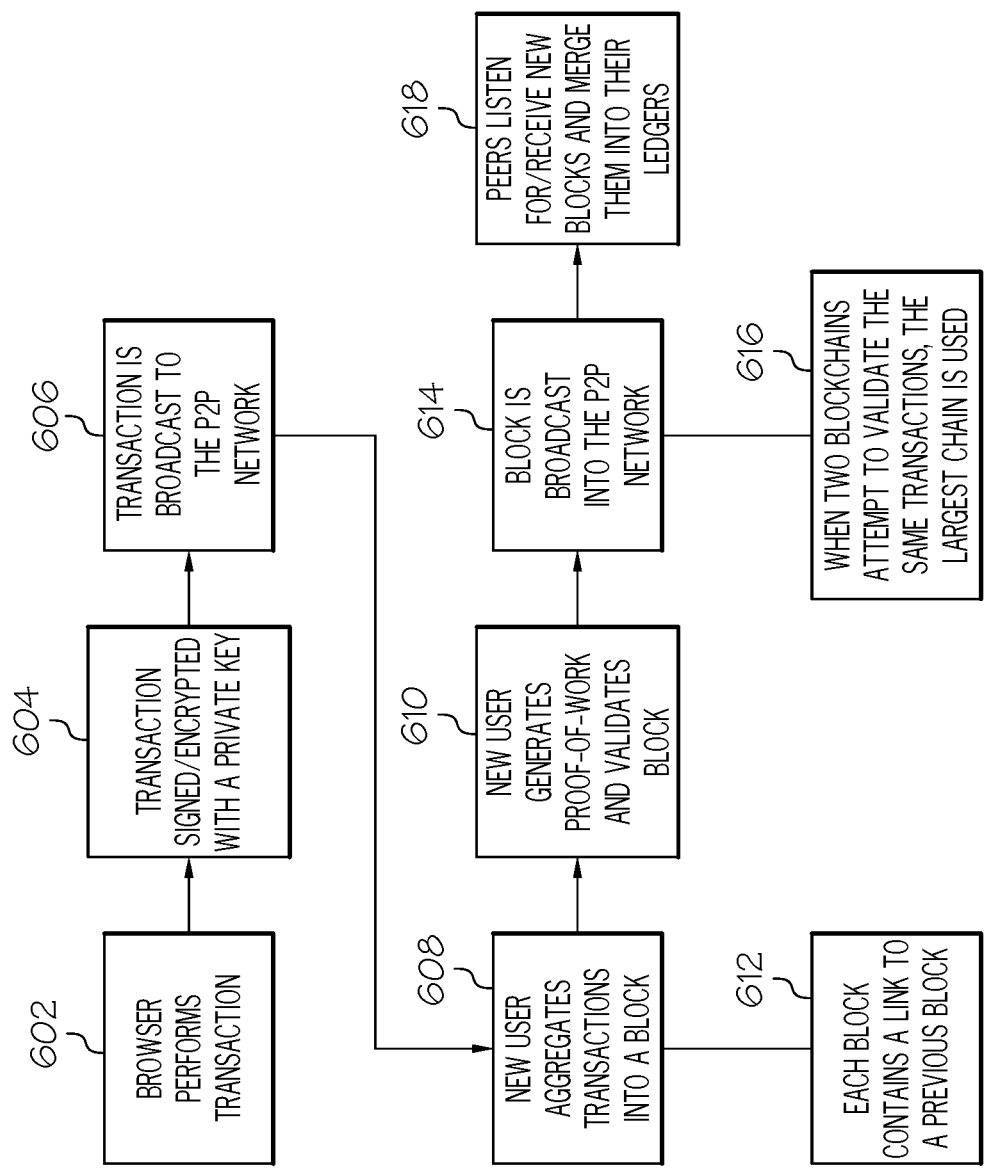
FIG. 6 illustrates a high-level overview of one or more embodiments of the present invention.

With reference now to FIG. 6, a high-level overview of one or more embodiments of the present invention is presented.

As shown in block 602, a user creates a transaction (e.g., turns on his/her smartphone, makes a phone call, adds a contact to his/her contact list, etc.).

As shown in block 604, the user then signs/encrypts the transaction using a private key, and broadcasts the signed/encrypted transaction to a peer-to-peer network (e.g., peer-to-peer network 410 shown in FIG. 4), as described in block 606.

Thus, the actions performed in blocks 602, 604, 606 are performed on the smartphone.

As shown in block 608, a new user (e.g., one of the peers 401a-401b shown in FIG. 4) then aggregates transactions into a "block" (i.e., a block that contains a description of the transaction created in block 602). As shown in block 610, a new user (preferably a different peer from peers 401a-401b that created the "block") generates a proof-of-work to validate the "block". That is, as described in block 612, each block is verified by the validator as containing a link to a previous block, thus making it able to be incorporated into the blockchain. More specifically, each new block is encrypted using information in the previous block in the blockchain, thus ensuring the security of the blockchain.

As described in block 614, the block (describing the newly created transaction) is then broadcast into the peer-to-peer network. As described in block 616, if two blocks attempt to validate the same transaction, then the largest blockchain is used. That is, two blockchains may be appropriate for incorporating the new block. If so, then the blockchain that is the largest will be given preference for receiving and incorporating the new block.

Thus, the actions performed in blocks 608, 610, 614 are validator/miner actions (rather than user actions).

As shown in block 618, the user (i.e., the smartphone) listens for new blocks from the peer-to-peer network, and merges them into local ledgers (i.e., records of transactions/actions/settings/etc.) on the smartphone.

Figure 7:
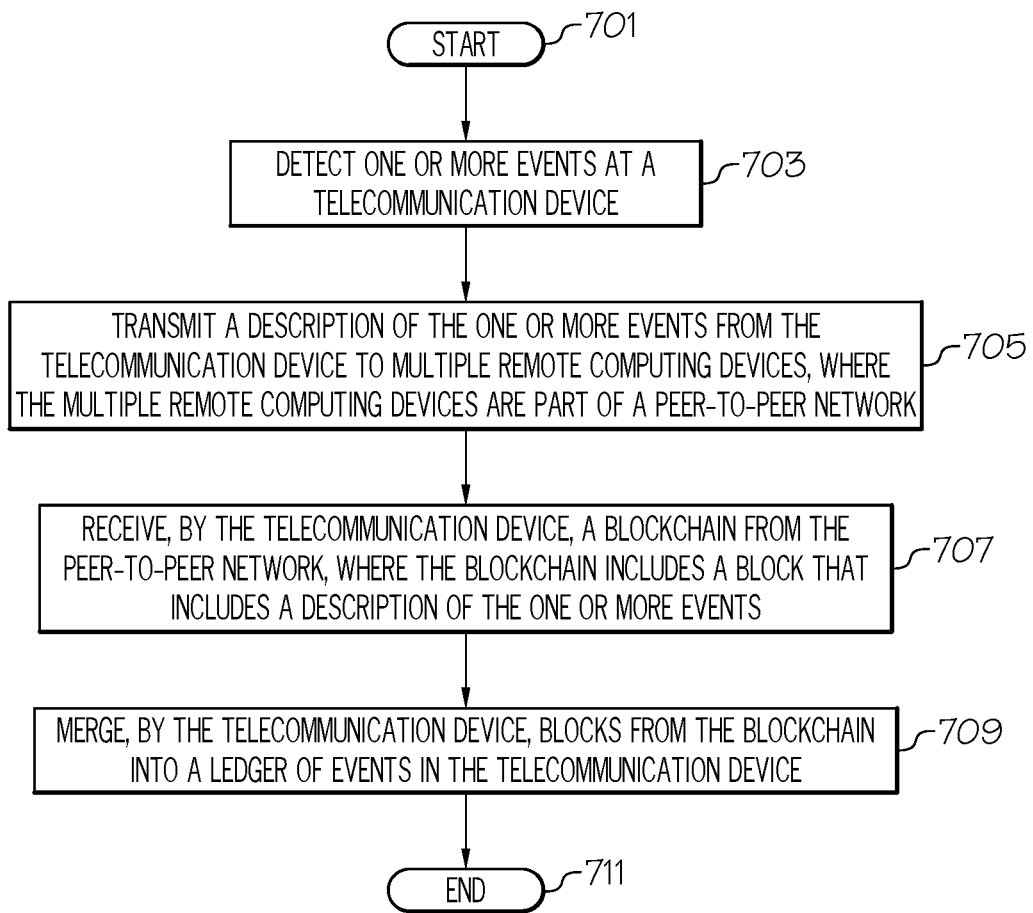
FIG. 7 is a high-level flow chart illustrating a process in accordance with one or more embodiments of the present invention.

With reference now to FIG. 7, a high-level flow chart illustrating a process in accordance with one or more embodiments of the present invention is presented.

After initiator block 701, one or more processors (e.g., within a smartphone) detect one or more events at a telecommunication device (e.g., a smartphone), as described in block 703. These events may be a phone call connection being made, a text message being received or sent, new contact information being stored, a hardware event (e.g., a memory overload) in the smartphone, etc.

As described in block 705, one or more processors then transmit a transaction of the one or more events from the telecommunication device to multiple remote computing devices (e.g., peers 401a-401d shown in FIG. 4), where the remote computing devices are part of a peer-to-peer network (e.g., peer-to-peer network 410 shown in FIG. 4), and where the peer-to-peer network supports a blockchain that includes a block that includes the transaction of the one or more events.

As described in block 707, the telecommunication device (e.g., the smartphone) has received the blockchain from the peer-to-peer network.

As described in block 709, the telecommunication device then merges the ledger of events into blocks from the blockchain at the telecommunication device (i.e., a local log within the smartphone), thus allowing the smartphone to keep an up-to-date record of its transactions.

The flow chart ends at terminator block 711.

As described herein, in one or more embodiments of the present invention, the multiple remote computing devices are other telecommunication devices.

In an embodiment of the present invention, one or more processors transmit the transaction of the one or more events to a validation module in the distributed peer-to-peer network, as described in FIG. 5. Thus, the block is not added to the blockchain until the validation module validates the transaction of the one or more events and the block.

The term "event" is used herein as describing an action (e.g., a phone call being made), a state (e.g., the smartphone being turned on, a setting on the smartphone), or a record. This event triggers a transaction generator, as described in FIG. 11.

Figure 11:
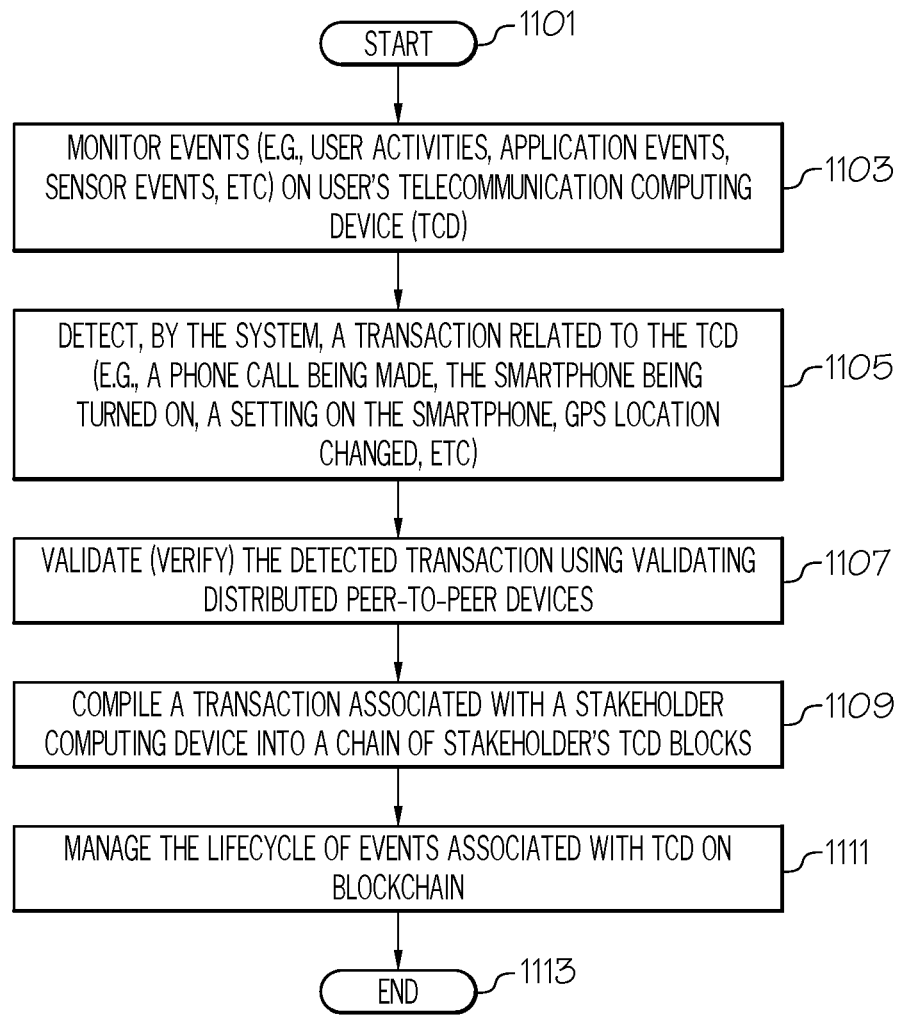
FIG. 11 illustrates an exemplary system that can be used when performing the steps shown in FIG. 10.
Figure 12:
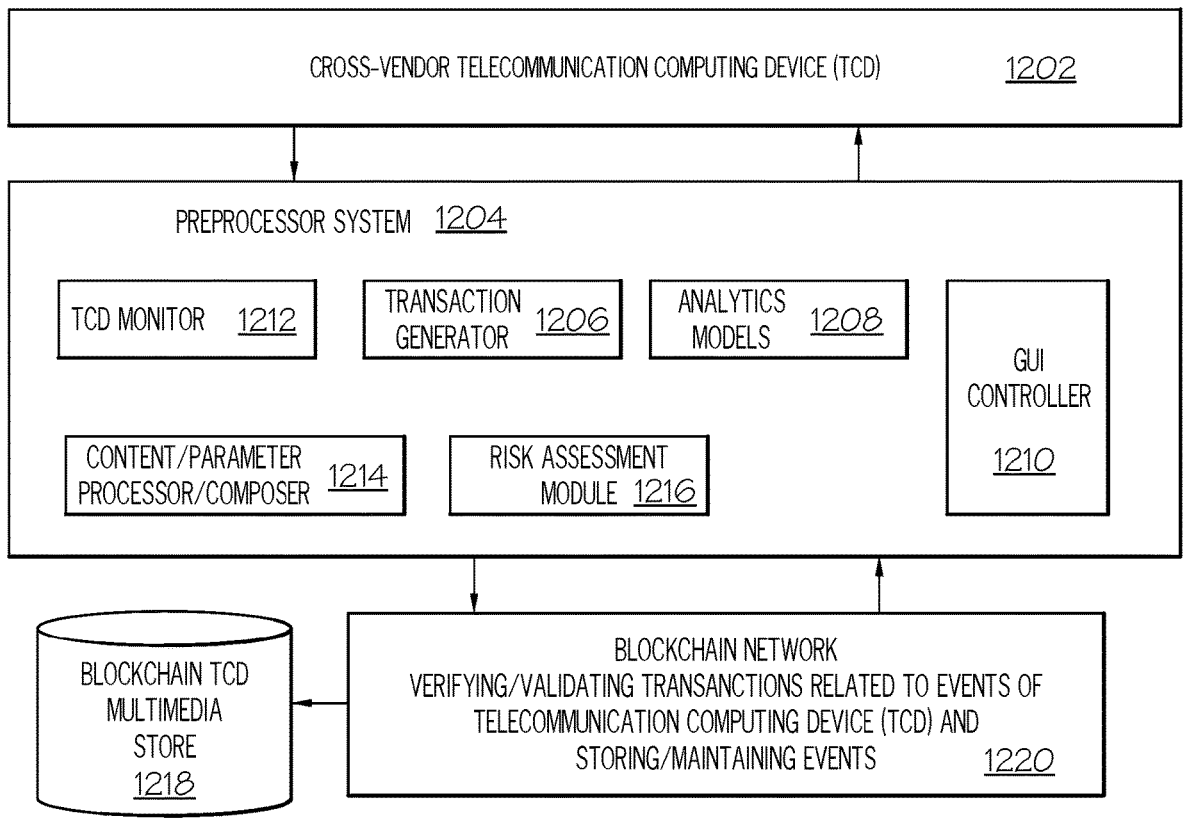
FIG. 12 illustrates a description of an exemplary blockchain as used in one or more embodiments of the present invention.

With reference now to FIG. 11, after initiator block 1101 a system (e.g., preprocessor system 1204 shown in FIG. 12 (analogous to trans-vendor service server 155 shown in FIG. 1)) monitors events such as user activities, application events, sensor events, etc. on a user's telecommunication computing device (TCD), such as the cross-vendor telecommunication device 1202 shown in FIG. 12, as depicted in block 1103.

As described in block 1105 of FIG. 11, the system detects a transaction, which is generated by transaction generator 1206 and which is related to the cross-vendor TCD 1202. Examples of such transactions include, but are not limited to, a phone call being made by the cross-vendor TCD 1202 (e.g., when configured as a smartphone), a setting made on the smartphone, a change to a global positioning system (GPS) location of the smartphone, etc. Such changes can be detected by the TCD monitor 1212 shown in FIG. 12, which monitors the current state of the cross-vendor TCD 1202. This monitoring/detection can be relayed to the cross-vendor TCD 1202 using a GUI controller 1210, which directs a GUI on the cross-vendor TCD 1202 to display an indication of such monitoring/detection that is occurring.

As described in block 1107 of FIG. 11, the preprocessor system 1204 validates (i.e., verifies) the detected transaction using validating distributed peer-to-peer devices, such as those found in the blockchain network 1220 (similar to the peer-to-peer network 410 shown in FIG. 4). This validation may be performed using analytics models 1208, which identify and validate certain transactions. In an embodiment of the present invention, a risk assessment module 1216 identifies any risks (e.g., to the blockchain in the blockchain network 1220, to the cross-vendor TCD 1202, etc.) that are posed by the detected transaction. If such risks exceed a predefined level, then an adjustment to the detected transaction (e.g., deleting the detected transaction) may be performed in accordance with one or more embodiments of the present invention.

As described in block 1109, the transaction detected in block 1105 (which is associated with the stakeholder computing device—e.g., cross-vendor TCD 1202) is compiled into a chain of the stakeholder's blocks (i.e., a blockchain associated with cross-vendor TCD 1202). This compilation can be performed by a content/parameter processor/composer 1214 found in the preprocessor system 1204, sent to the blockchain network 1220, and then stored in a blockchain TCD multimedia store 1218.

As described in block 1101, the preprocessor system 1204 thereafter manages a lifecycle of the events/transactions associated with the cross-vendor TCD 1202 on the blockchain, including managing the storage, retrieval, and maintenance of the blockchain stored on the blockchain TCD multimedia store 1218.

The flow-chart shown in FIG. 11 ends at terminator block 1113.

In an embodiment of the present invention in which the "event" describes an action, the event may not only be what is put into the block, but may also be the impetus for creating the block. Thus, the transaction of the one or more events is transmitted from the telecommunication device to a remote computing device in response to a user of the telecommunication device performing an action from a group consisting of making a call on the telecommunication device, adding a contact in the telecommunication device, sending a message from the telecommunication device, receiving a message at the telecommunication device, and saving a message on the telecommunication device.

In an embodiment of the present invention and described herein, the transaction of the one or more events is from a group consisting of a record of phone numbers called by the telecommunication device, a record of contact information used by the telecommunication device, a record of chat messages exchanged using the telecommunication device, a record of geolocation changes by the telecommunication device, a record of audio files received by the telecommunication device, and a record of photos stored on the telecommunication device. Thus, such "events" are various records of various types of files in the smartphone.

In an embodiment of the present invention in which the "event" is a state of the smartphone (e.g., settings on the smartphone), the one or more events are feature settings on the telecommunication device, and wherein the feature settings are from a group consisting of a ringtone setting, a volume level setting, and an accessibility setting.

In an embodiment of the present invention in which the "event" is a state of the smartphone (e.g., the phone being active), an event from the one or more events may be the telecommunication device being turned off or on.

In an embodiment of the present invention in which the "event" is a record of calls made or blocked on the smartphone, the one or more events describe features of calls made the smartphone, where the feature of the calls is from a group consisting of a length of each of the calls, times at which each of the calls was made, phone numbers to which calls were made, and blocked phone numbers that are not accepted by the smartphone.

In an embodiment of the present invention, one or more processors (e.g., within the smartphone) adjust a frequency of transmitting the transaction of the one or more events from the telecommunication device to the remote computing device according to a current location of the telecommunication device. For example, if the smartphone is located within a highly secure area (e.g., a research lab), then transaction information may be sent less often than if the smartphone is in a highly public area, since the ledger needs to be updated more often if there is a greater chance of the smartphone being lost or stolen in the highly public area.

In an embodiment of the present invention, one or more processors (e.g., within the smartphone) receive biometric readings from biometric sensors (e.g., biometric sensors 157 shown in FIG. 1) on the telecommunication device. The biometric readings describe a biometric state (e.g., fear, anger, fatigue, acute health issues, etc.) of a user of the telecommunication device. One or more processors/modules determine a context (e.g., state) of the user based on the biometric readings, and then adjust a frequency of transmitting the transaction of the one or more events from the telecommunication device to the remote computing device according to the context of the user. For example, if the biometric sensors indicate that the user is fatigued, then the transaction of the events may be sent to the peer-to-peer network for inclusion into the blockchain, since the user may be more likely to misplace the smartphone while fatigued.

As shown in FIG. 2, in an embodiment of the present invention one or more modules/processors (e.g., within the smartphone) display a dedicated button (e.g., blockchain activation button 202) on a display of the telecommunication device, where activating the dedicated button causes the telecommunication device to transmit the transaction of the one or more events from the telecommunication device to the remote computing device. In one embodiment, this transmission is a one-time occurrence of transmitting the transaction of the event(s) when the dedicated button is activated. In another embodiment, once the dedicated button is double touched or otherwise activated, every time an event occurs it will be sent out to be another block in the blockchain described herein (until the dedicated button is touched again, in order to stop creating new blocks).

In an embodiment of the present invention, if a secure digital (SD) chip/card is removed from a smartphone, that smartphone is no longer able to access the blockchain (thus ensuring that a new owner of the smartphone is unable to access the blockchain). Thus, one or more processors (e.g., within the smartphone) detect a removal of a secure digital card from the telecommunication device and, in response to detecting the removal of the secure digital card from the telecommunication device, de-associate the telecommunication device from the blockchain.

In an embodiment of the present invention, the blockchain keeps a record of the state of hardware components in the smartphone. Thus, one or more processors (e.g., within the smartphone) receive sensor readings from hardware sensors (e.g., hardware component sensors 159 shown in FIG. 1) that detect conditions of hardware components of the telecommunication device. The processor(s) incorporate the sensor readings into the transaction of the one or more events that is transmitted from the telecommunication device to the remote computing device, and then predict a future condition of one or more of the hardware components based on the blockchain that is received from the distributed peer-to-peer network. In an embodiment, this future condition is a failure of the one or more hardware components. Based on the prediction (of a future condition and/or failure), the system may order a replacement part (to be used to preemptively upgrade the telecommunication device) and/or may directly upgrade the telecommunication device (e.g., by uploading a software patch to the telecommunication device), in order to avoid/avert the predicted future condition.

While the present invention has been described primarily in the context of a distributed peer-to-peer network creating the blockchain, a trans-vendor service may create the blockchain in one or more embodiments. This trans-vendor service is a service that 1) is able to receive information from different types of devices, different cellular carriers, smartphones that use different operating systems, etc., and nonetheless still be able to 2) create a blockchain using blocks from these disparate systems/carriers. This allows the invention to create a blockchain that is not specific for a particular smartphone, but rather describes events that occur in various smartphones, using various carriers, etc. Thus, in an embodiment of the present invention, a method of tracking and maintaining a record of disparate telecommunication device events begins with one or more processors (e.g., within a first smartphone) detecting an event at the telecommunication device (i.e., the first smartphone). The smartphone then transmits a transaction of the event from the telecommunication device to a trans-vendor service, which operates across disparate devices, service carriers, and operating systems. The trans-vendor service receives transactions of events from these disparate devices, service carriers, and operating systems to create a blockchain that comprises a block that comprises the transaction of the event and blocks that describe events from the disparate devices, service carriers, and operating systems.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
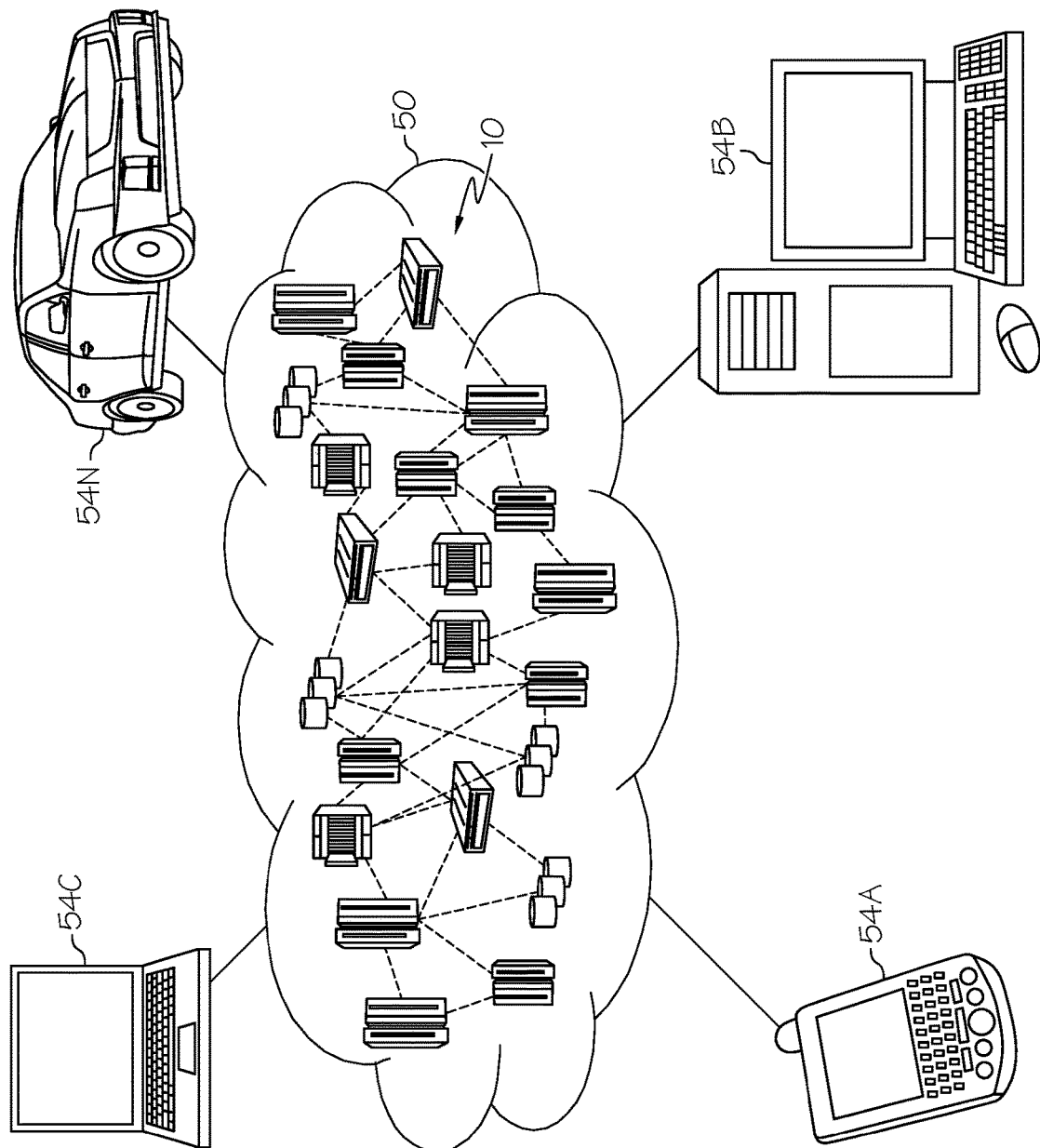
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 8 are intended to be illustrative only and that computing nodes 10 and cloud computing environment 50 can communicate with any type of computerized device over any type of network and/or network addressable connection (e.g., using a web browser).

Figure 9:
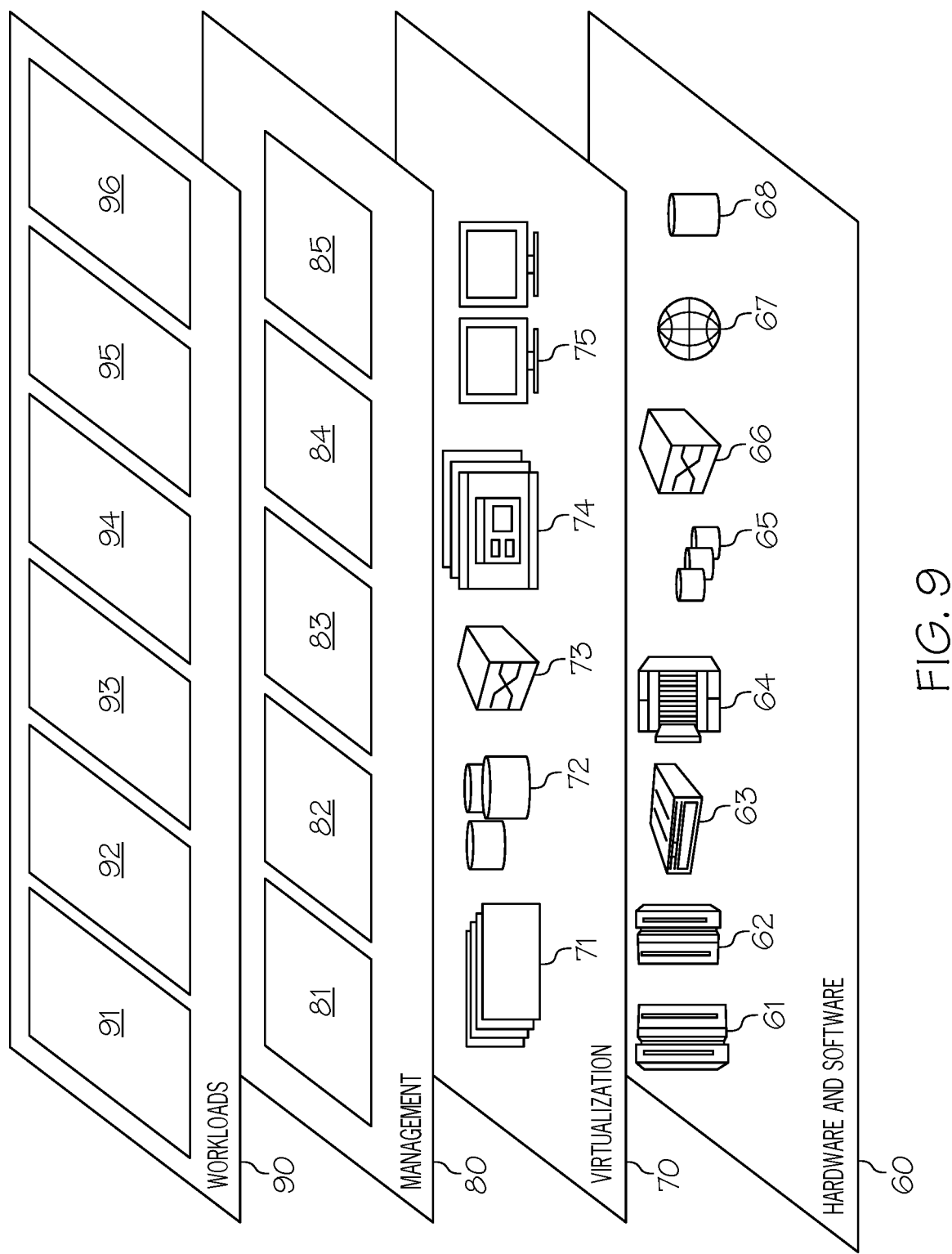
FIG. 9 depicts abstraction model layers of a cloud computer environment according to an embodiment of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and telecommunication device event storage and maintenance processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method of tracking and maintaining a record of telecommunication device events, the computer-implemented method comprising:
   detecting, by one or more processors, one or more events at a telecommunication device;
   transmitting, by one or more processors, a transaction of the one or more events from the telecommunication device to multiple remote computing devices, wherein the multiple remote computing devices are part of a peer-to-peer network, and wherein the peer-to-peer network supports a blockchain that comprises a block that comprises the transaction of the one or more events;
   blocking, by one or more processors, a telecommunication service provider for the telecommunication device from receiving the block that comprises the transaction of the one or more events;

determining, by one or more processors, a risk assessment of potential damage to the telecommunication device based on a current activity of a user of the telecommunication device; and adjusting, by one or more processors, a frequency of transmitting the transaction of the one or more events from the telecommunication device to the multiple remote computing devices according to the risk assessment of potential damage to the telecommunication device based on the current activity of the user of the telecommunication device.

2. The computer-implemented method of claim 1, further comprising:

receiving, by the telecommunication device, the blockchain from the peer-to-peer network; and merging, by the telecommunication device, blocks from the blockchain into a ledger of events in the telecommunication device.

3. The computer-implemented method of claim 2, further comprising:

receiving, by one or more processors, sensor readings from hardware sensors that detect conditions of hardware components of the telecommunication device;

incorporating, by one or more processors, the sensor readings into the transaction of the one or more events that is transmitted from the telecommunication device to the multiple remote computing devices; and predicting, by one or more processors, a future condition of one or more of the hardware components based on the blockchain that is received from the peer-to-peer network.

4. The computer-implemented method of claim 1, wherein the multiple remote computing devices are telecommunication devices.

5. The computer-implemented method of claim 1, further comprising:

transmitting, by one or more processors, the transaction of the one or more events to a validation module in the peer-to-peer network, wherein the block is not added to the blockchain until the validation module validates the transaction of the one or more events and the block.

6. The computer-implemented method of claim 1, wherein the transaction of the one or more events is from a group consisting of a record of phone numbers called by the telecommunication device, a record of contact information used by the telecommunication device, a record of chat messages exchanged using the telecommunication device, a record of geolocation changes by the telecommunication device, a record of audio files received by the telecommunication device, and a record of photos stored on the telecommunication device.

7. The computer-implemented method of claim 1, wherein the one or more events are feature settings on the telecommunication device, and wherein the feature settings are from a group consisting of a ringtone setting, a volume level setting, and an accessibility setting.

8. The computer-implemented method of claim 1, wherein an event from the one or more events is the telecommunication device being turned off or on.

9. The computer-implemented method of claim 1, wherein the telecommunication device is a phone, wherein the one or more events describe features of calls made the phone, and wherein the features of the calls are from a group consisting of a length of each of the calls, of a time at which each of the calls was made, phone numbers to which the calls were made, and blocked phone numbers that are not accepted by the phone.

10. The computer-implemented method of claim 1, further comprising:

determining, by one or more processors, a risk level of losing the telecommunication device based on a current location of the telecommunication device; and further adjusting, by one or more processors, the frequency of transmitting the transaction of the one or more events from the telecommunication device to the multiple remote computing devices according to the risk level of losing the telecommunication device based on the current location of the telecommunication device.

11. The computer-implemented method of claim 1, further comprising:

receiving, by one or more processors, biometric readings from biometric sensors on the telecommunication device, wherein the biometric readings describe a biometric state of a user of the telecommunication device;

determining, by one or more processors, the biometric state of the user based on the biometric readings; and further adjusting, by one or more processors, the frequency of transmitting the transaction of the one or more events from the telecommunication device to the multiple remote computing devices according to the biometric state of the user.

12. The computer-implemented method of claim 1, wherein the transaction of the one or more events is transmitted from the telecommunication device to the multiple remote computing devices in response to a user of the telecommunication device performing an action from a group consisting of making a call on the telecommunication device, adding a contact in the telecommunication device, sending a message from the telecommunication device, receiving a message at the telecommunication device, and saving a message on the telecommunication device.

13. The computer-implemented method of claim 1, further comprising:

displaying, by one or more processors, a dedicated button on a display of the telecommunication device, wherein activating the dedicated button with an initial touch causes the telecommunication device to transmit the transaction of the one or more events from the telecommunication device to the multiple remote computing devices, and wherein activating the dedicated button with a subsequent touch after the initial touch stops new blocks from being created in the blockchain for the telecommunication device;

receiving, by one or more processors, the initial touch;

in response to receiving the initial touch, transmitting, by one or more processors, the transaction of the one or more events from the telecommunication device to the multiple remote computing devices;

receiving, by one or more processors, the subsequent touch; and in response to receiving the subsequent touch, stopping, by one or more processors, new blocks from being created in the blockchain for the telecommunication device.

14. The computer-implemented method of claim 1, further comprising:

detecting, by one or more processors, a removal of a secure digital chip from the telecommunication device; and in response to detecting the removal of the secure digital chip from the telecommunication device, de-associating, by one or more processors, the telecommunication device from the blockchain, wherein de-associating the telecommunication device from the blockchain prevents access to the blockchain from the telecommunication device.

15. A computer-implemented method of tracking and maintaining a record of disparate telecommunication device events, the computer-implemented method comprising:
   detecting, by one or more processors, one or more events at a telecommunication device;
   transmitting, by one or more processors, a transaction of the one or more events from the telecommunication device to multiple remote computing devices, wherein the multiple remote computing devices are part of a peer-to-peer network, and wherein the peer-to-peer network supports a blockchain that comprises a block that comprises the transaction of the one or more events;
   blocking, by one or more processors, a telecommunication service provider for the particular telecommunication device from receiving the block that comprises the transaction of the one or more events;
   determining, by one or more processors, a risk level of losing the telecommunication device based on a current location of the telecommunication device; and
   adjusting, by one or more processors, a frequency of transmitting the transaction of the one or more events from the telecommunication device to the multiple remote computing devices according to the risk level of losing the telecommunication device based on the current location of the telecommunication device.

16. A computer program product for tracking and maintaining a record of telecommunication device events, the computer program product comprising a computer readable storage device having program instructions embodied therewith, the program instructions readable and executable by a computer to perform a method comprising:
   detecting one or more events at a telecommunication device;
   transmitting a transaction of the one or more events from the telecommunication device to multiple remote computing devices, wherein the multiple remote computing devices are part of a peer-to-peer network, and wherein the peer-to-peer network supports a blockchain that comprises a block that comprises the transaction of the one or more events;
   blocking a telecommunication service provider for the telecommunication device from receiving the block that comprises the transaction of the one or more events;
   determining a risk assessment of potential damage to the telecommunication device based on a current activity of a user of the telecommunication device; and
   adjusting a frequency of transmitting the transaction of the one or more events from the telecommunication device to the multiple remote computing devices according to the risk assessment of potential damage to the telecommunication device based on the current activity of the user of the telecommunication device.

17. The computer program product of claim 16, wherein the multiple remote computing devices are telecommunication devices.

18. The computer program product of claim 16, wherein the method further comprises:
   transmitting the transaction of the one or more events to a validation module in the peer-to-peer network, wherein the block is not added to the blockchain until the validation module validates the transaction of the one or more events and the block.

19. The computer program product of claim 16, wherein the program instructions are provided as a service in a cloud environment.

20. A computer-implemented method of tracking and maintaining a record of telecommunication device events, the computer-implemented method comprising:
   detecting, by one or more processors, one or more events at a telecommunication device;
   transmitting, by one or more processors, a transaction of the one or more events from the telecommunication device to multiple remote computing devices, wherein the multiple remote computing devices are part of a peer-to-peer network, and wherein the peer-to-peer network supports a blockchain that comprises a block that comprises the transaction of the one or more events;
   blocking, by one or more processors, a telecommunication service provider for the telecommunication device from receiving the block that comprises the transaction of the one or more events;
   receiving, by one or more processors, biometric readings from biometric sensors on the telecommunication device, wherein the biometric readings describe a biometric state of a user of the telecommunication device;
   determining, by one or more processors, the biometric state of the user based on the biometric readings; and
   adjusting, by one or more processors, a frequency of transmitting the transaction of the one or more events from the telecommunication device to the multiple remote computing devices according to the biometric state of the user.

* * * * *